US012629971B2

(12) United States Patent (10) Patent No.: US 12,629,971 B2

Lu et al. (45) Date of Patent: May 19, 2026

(54) TIRE PRESSURE SENSOR AND AUTOMOBILE TIRE

(71) Applicant: Autel Intelligent Technology Corp., Ltd., Shenzhen (CN)

(72) Inventors: Haibin Lu, Shenzhen (CN); Dengguo Zhang, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 279 days.

(21) Appl. No.: 18/557,589

(22) PCT Filed: Apr. 13, 2022

(86) PCT No.: PCT/CN2022/086543
§ 371 (c)(1),
(2) Date: Oct. 27, 2023

(87) PCT Pub. No.: WO2022/228120
PCT Pub. Date: Nov. 3, 2022

(65) Prior Publication Data
US 2024/0208279 A1 Jun. 27, 2024

(30) Foreign Application Priority Data

Apr. 28, 2021 (CN) .......................... 202120903638.1

(51) Int. Cl.
B60C 23/04 (2006.01)

(52) U.S. Cl.
CPC ...... B60C 23/0494 (2013.01); B60C 23/0493 (2013.01)

(58) Field of Classification Search
CPC ..................... B60C 23/0493; B60C 23/0494
See application file for complete search history.

(56) References Cited

U.S. PATENT DOCUMENTS 7,654,136 B2 * 2/2010 Liao .................... B60C 23/0408
73/146.8
8,649,181 B2 * 2/2014 Yamaguchi ......... B60C 23/0493
73/146

FOREIGN PATENT DOCUMENTS

CN 204136709 U * 2/2015
CN 104859387 A 8/2015
(Continued)

OTHER PUBLICATIONS

International Search Report of PCT Patent Application No. PCT/CN2022/086543 issued on Jul. 19, 2022.

*Primary Examiner* — Jill E Culler
(74) *Attorney, Agent, or Firm* — Andrew C. Cheng

(57) ABSTRACT

The tire pressure sensor includes: a housing, a fixed base being provided in the housing; the fixed base being provided with an accommodation recess having an upward opening; a vent hole penetrated to the exterior of the housing being provided on the bottom wall of the accommodation recess; a circuit board fixed in the housing and being provided with a tire pressure detection chip; an elastic sealing member located between the bottom wall of the accommodation recess and the tire pressure detection chip, and being used for sealing a gap between the bottom wall of the accommodation recess and the tire pressure detection chip, and the elastic sealing member being provided with a communication hole communicated with the detection hole and the vent hole; and a flexible sealant filled between the accommodation recess and the tire pressure detection chip, and between the accommodation recess and the elastic sealing member.

8 Claims, 5 Drawing Sheets

100

(56)           References Cited

FOREIGN PATENT DOCUMENTS

| | | | |
|---|---|---|---|
| CN | 205883796 U | 1/2017 | |
| CN | 208180683 U | 12/2018 | |
| CN | 211106787 U | 7/2020 | |
| CN | 215153707 U | 12/2021 | |
| JP | 2012047499 A | 3/2012 | |
| WO | WO-2017102185 A1 * | 6/2017 | ......... B60C 23/0494 |

* cited by examiner

TIRE PRESSURE SENSOR AND AUTOMOBILE TIRE

CROSS-REFERENCE TO RELATED APPLICATIONS

This application is the National Stage application for PCT patent application Serial No. PCT/CN2022/086543, filed on Apr. 13, 2022, which claims priority to Chinese Patent Application No. 202120903638.1, entitled "TIRE PRES-SURE SENSOR AND AUTOMOBILE TIRE", filed on Apr. 28, 2021, by China Patent Office, which is incorporated herein by reference in its entirety.

TECHNICAL FIELD

Embodiments of the present application relate to the technical field of tire pressure sensors, in particular to a tire pressure sensor and an automobile tire.

BACKGROUND OF THE INVENTION

Whether the tire pressure of an automobile tire is normal or not has an impact on the service life of the automobile tire as well as the operation stability, comfort and safety when driving the automobile. In order to monitor tire pressure of the automobile tire, a tire pressure sensor with high sensitivity is usually mounted at an end of a tire valve inside the tire so as not to monitor pressure information inside the automobile tire in real time.

At present, tire sensors are directly mounted in the interior of automobile tires. A tire pressure detection chip needs to work in the complex environment such as high temperature, low temperature, humidity, vibration, high-speed rotation and so on. The poor sealing performance of the tire pressure detection chip itself causes the tire pressure detection chip to be easily corroded in contact with the water vapor inside the tire, or easily damaged due to vibration, impact and so on, which greatly reduces its service life.

SUMMARY OF THE INVENTION

In view of the above-mentioned problems, embodiments of the present application provide a tire pressure sensor and an automobile tire, which improve the sealing protection effect of a tire pressure detection chip and improve the service life thereof.

According to an aspect of an embodiment of the present application, a tire pressure sensor is provided, which includes: a housing, a fixed base being provided in the house, the fixed base being provided with an accommodation recess having an upward opening, and a vent hole penetrated to the exterior of the housing being provided on the bottom wall of the accommodation recess; a circuit board being fixed in the housing, the circuit board being provided with a tire pressure detection chip, and the tire pressure detection chip being located in the accommodation recess, and being provided with a detection hole at a position corresponding to the vent hole; an elastic sealing member located between the bottom wall of the accommodation recess and the tire pressure detection chip, and being used for sealing a gap between the bottom wall of the accommodation recess and the tire pressure detection chip, and the elastic sealing member being provided with a communication hole communicated with the detection hole and the vent hole; and a flexible sealant filled between the inner peripheral wall of the accommodation recess and the outer periph-eral wall of the tire pressure detection chip, and between the inner peripheral wall of the accommodation recess and the outer periphery of the elastic sealing member.

In an alternative, a limiting groove is further provided at the middle of the bottom wall of the accommodation recess, the accommodation recess, the limiting groove and the vent hole are successively arranged in communication from top to bottom on the fixed base, and in an axial direction of the vent hole, the cross-sectional area of the limiting groove is greater than that of the vent hole and less than that of the accommodation recess; the elastic sealing member is adapted to the limiting groove, and part of the elastic sealing member is located in the limiting groove, and the other part is located in the accommodation recess and is in extrusion contact with the tire pressure detection chip.

In an alternative, a side wall of the accommodation recess at the opening is further provided with a plurality of exhaust channels spaced along an edge of the opening.

In an alternative, an area of the face of the elastic sealing member facing the tire pressure detection chip is greater than an area of the face of the tire pressure sensor chip facing the elastic sealing member.

In an alternative, the flexible sealant has a viscosity of from 1500 to 4500 cps.

In an alternative, the gap between the inner peripheral wall of the accommodation recess and the outer peripheral wall of the elastic sealing member is 0.8-1.0 mm.

In an alternative, the resilient seal is made of silicone.

In an alternative, a buckle is further provided in the housing and has a height inside the housing of greater than that of the fixed base fixed inside the housing, the circuit board is provided at the top of the opening of the accom-modation recess, and the buckle is buckled to be fixed with the circuit board.

In an alternative, the tire pressure sensor further com-prises a housing cap connected to the housing and enclosing an enclosed space, the circuit board being located within the enclosed space.

According to another aspect of an embodiment of the present application, an automobile tire is provided, which comprises: a tire body and the above tire pressure sensor, wherein the tire pressure sensor is mounted inside the tire body.

For the tire pressure sensor according to an embodiment of the present application, a tire pressure detection chip is placed in an accommodation recess on a fixed base, a gap between the tire pressure detection chip and the bottom wall of the accommodation recess is sealed by means of an elastic sealing member so that a communication hole between the detection hole and the vent hole forms an enclosed channel, and the tire pressure detection chip only contacts the air inside the tire through the enclosed channel to detect the air pressure inside the tire. A flexible sealant is filled between the inner peripheral wall of the accommodation recess and the outer peripheral wall of the elastic seal, and between the inner peripheral wall of the accommodation recess and the outer peripheral wall of the tire pressure detection chip, so that an end of the tire pressure detection chip provided with the detection hole is placed in the accommodation recess and is sealed and protected, thereby greatly improving the seal-ing performance of the tire pressure detection chip. At the same time, the elastic sealing member and the flexible sealant can buffer the force of the housing on the tire pressing chip due to vibration and other reasons through their own elasticity. Compared with a conventional tire pressure sensor, the tire pressure detection chip of the embodiment of the present application, in addition to its own seal, is also sealed by an elastic sealing member and a flexible sealant, achieving a double seal, with a better sealing effect, which is beneficial to improving the service life thereof.

The above description is merely an overview of the technical solution of the present application, which can be implemented according to the contents of the description in order to enable the technical means of the present application to be more clearly understood, and in order to enable the above and other objects, features and advantages of the present application to be more clearly understood, particular embodiments of the present application are set forth below.

BRIEF DESCRIPTION OF DRAWINGS

Various other advantages and benefits will become apparent to a person skilled in the art upon reading the following detailed description of the preferred embodiments. The drawings are only for purposes of illustrating the preferred embodiments and are not to be construed as limiting the present application. Moreover, like reference numerals designate like parts throughout the several views. In the drawings.

Figure 1:
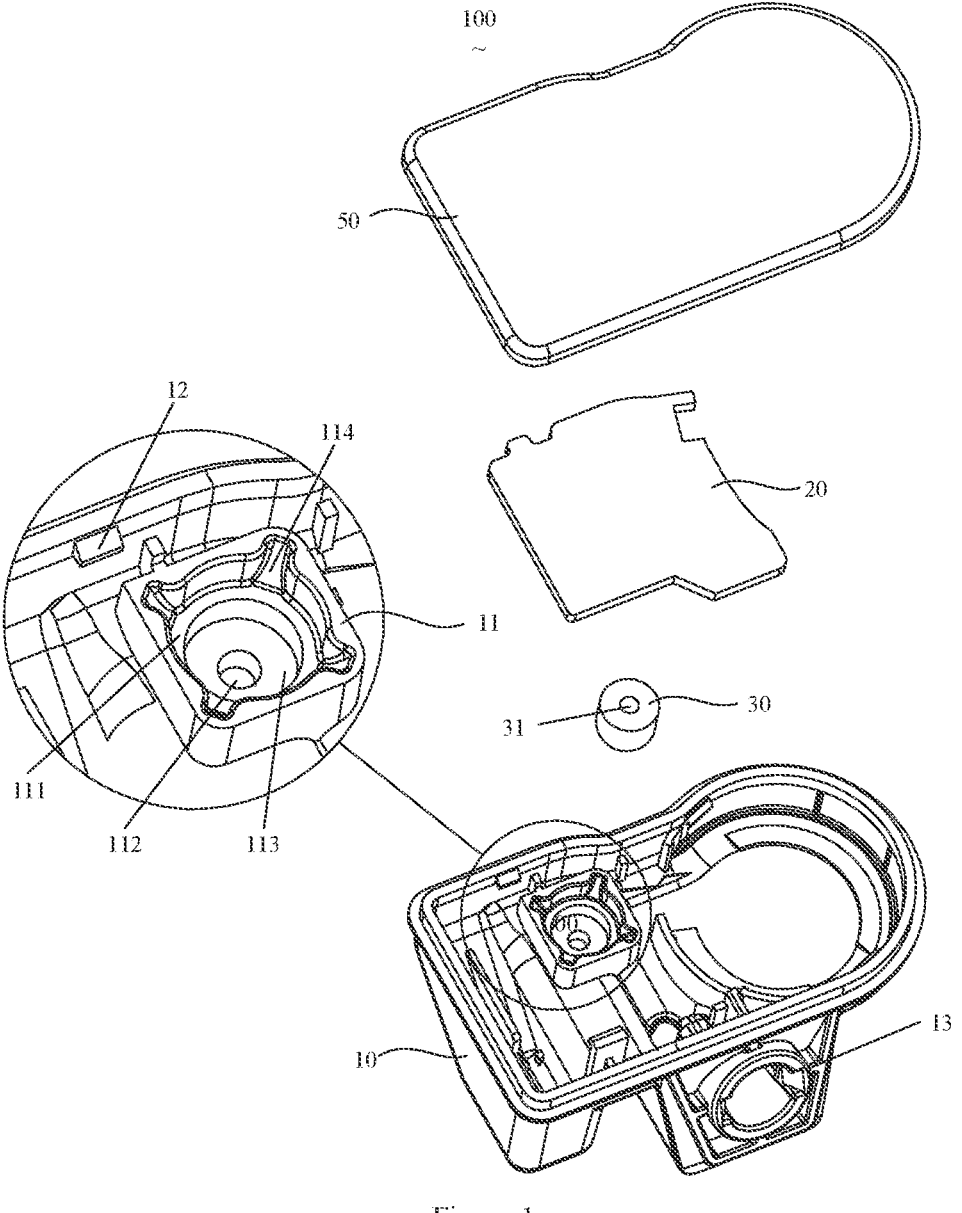
FIG. 1 shows an exploded view of a tire pressure sensor at a viewing angle according to an embodiment of the present application.

Reference numerals in the detailed description are as follows:

housing 10; fixed base 11; accommodation recess 111; vent hole 112; limiting groove 113; exhaust channel 114; buckle 12; connecting portion 13; circuit board 20; tire pressure detection chip 21; detection hole 211; elastic sealing member 30; communication hole 31; flexible sealant 40; housing cap 50; tire pressure sensor 100.

DETAILED DESCRIPTION OF THE INVENTION

Reference will now be made in detail to the embodiments of the present disclosure, examples of which are illustrated in the accompanying drawings. The following examples are provided only to illustrate the technical solution of the present application more clearly, and are therefore provided by way of example only, without limiting the scope of protection of the present application.

Figure 2:
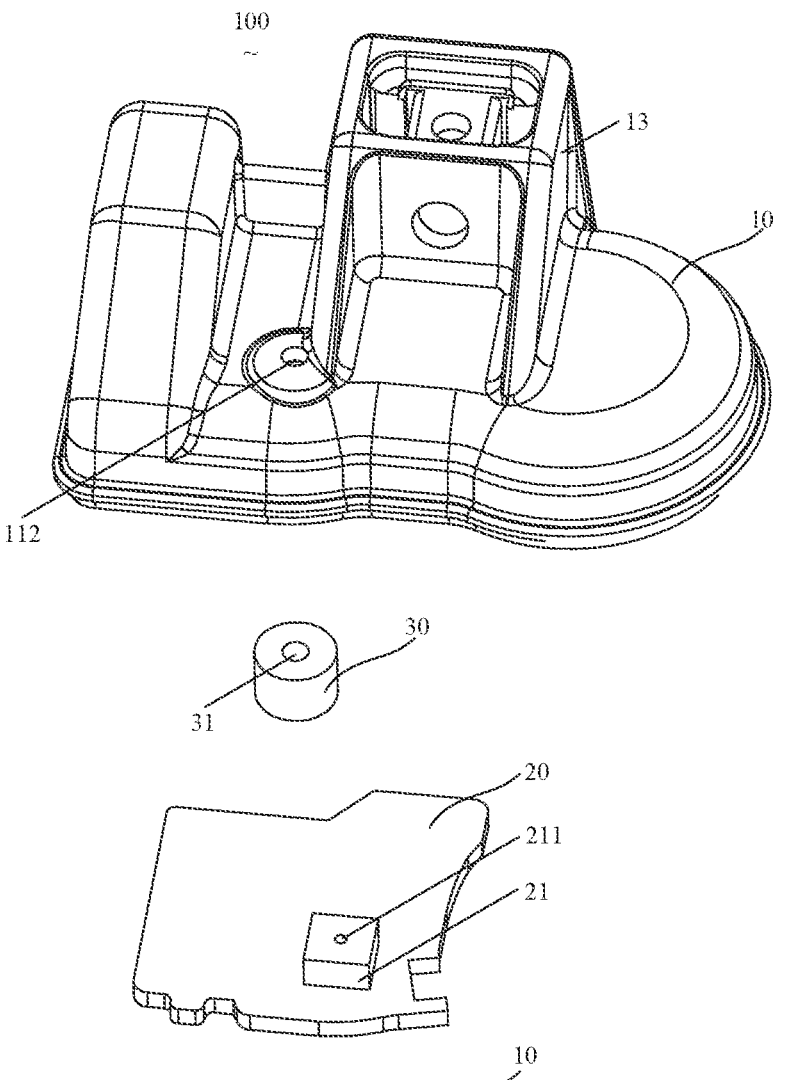
FIG. 2 shows another perspective exploded view of a tire pressure sensor according to an embodiment of the present application.
Figure 3:
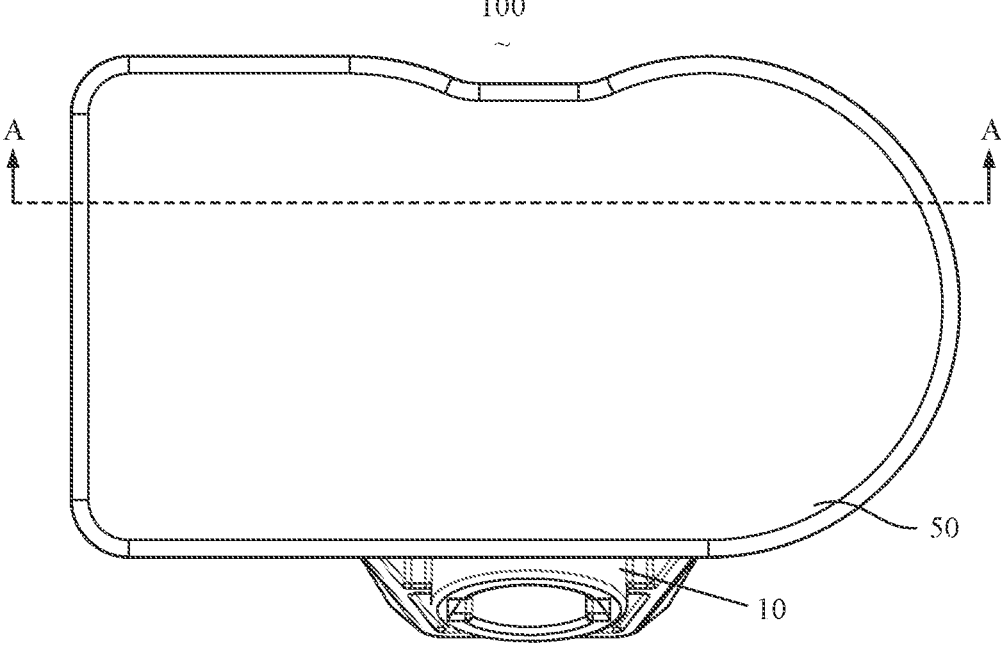
FIG. 3 shows a top view of a tire pressure sensor according to an embodiment of the present application.
Figure 4:
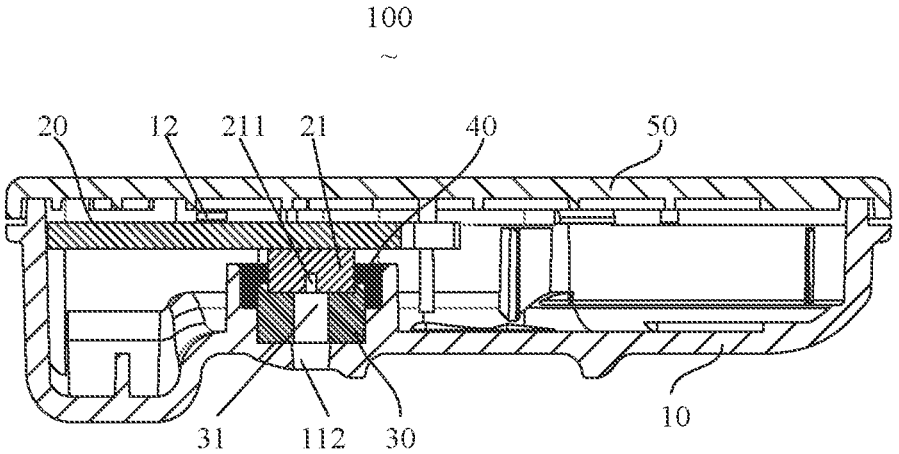
FIG. 4 is a sectional view taken along the direction A-A in FIG. 3.

Referring to FIGS. 1 to 4, FIG. 1 shows an exploded view of a tire pressure sensor 100 according to an embodiment of the present invention from one perspective, FIG. 2 shows an exploded view of the tire pressure sensor 100 according to an embodiment of the present invention from another perspective, FIG. 3 shows a top view of the tire pressure sensor 100 according to an embodiment of the present invention, and FIG. 4 shows a cross-sectional view taken along the line A-A in FIG. 3. The embodiment of the present application provides a tire pressure sensor 100 including a housing 10, a circuit board 20 and an elastic sealing member 30, a fixed base 11 is provided inside the housing 10, the fixed base 11 is provided with an accommodation recess 111 having an upward opening, a bottom wall of the accommodation recess 111 is provided with a vent hole 112 penetrating to the outside of the housing 10, and the vent hole 112 is used for communicating with the inside of a tire. The circuit board 20 is fixed in the housing 10 and is provided with a tire pressure detection chip 21 located in the accommodation recess 111, and the tire pressure detection chip 21 is provided with a detection hole 211 at a position corresponding to the vent hole 112. The elastic sealing member 30 is located between the bottom wall of the accommodation recess 111 and the tire pressure detection chip 21, the elastic sealing member 30 is used for sealing the gap between the bottom wall of the accommodation recess 111 and the tire pressure detection chip 21, and the elastic sealing member 30 is provided with a communication hole 31 communicating with the detection hole 211 and the vent hole 112. A flexible sealant 40 is filled between the inner peripheral wall of the accommodation groove 111 and the outer peripheral wall of the tire pressure detection chip 21, and between the inner peripheral wall of the accommodation groove 111 and the outer periphery of the elastic sealing member 30.

The detection hole 211 is a counterbore provided on the tire pressure detection chip 21. The accommodation recess 111 may be adapted to the tire pressure detection chip 21, or may be a cylindrical groove such as a regular prism shape or a cylindrical groove, which is not particularly limited herein. The flexible sealant 40 may be silicone rubber, polyurethane glue, or the like.

Since the tire pressure detection chip 21 in the conventional tire pressure sensor 100 has its own sealing structure, the sealing structure comprises a protective layer arranged on the periphery of the chip body and a metal cover provided on one end of the chip body where a monitoring hole is provided, and a glue is used to connect and seal between the metal cover and the protective layer to seal and protect the chip body. Since the monitoring hole of the chip body needs to be in contact with the air inside the tire, the metal cover needs to be provided with a detection hole 211 for communicating with the air inside the tire and the monitoring hole, and the tire pressure detection chip 21 as a whole has a small size, making the protective layer weak, making it difficult to achieve good sealing between the metal cover and the protective layer after being fixed by glue, being easily corroded by moisture in working environments such as a high temperature or a low temperature inside the tire, being less resistant to impact force in environments such as vibration and high-speed rotation, and being easily damaged.

It should be noted that the tire pressure detection chip 21 according to an embodiment of the present application has the above-described sealing structure, which is not shown in the drawings.

However, for the tire pressure sensor 100 according to an embodiment of the present application, an accommodation recess 111 for accommodating and fixing the tire pressure detection chip 21 is provided on the fixed base 11 inside the housing 10, the tire pressure detection chip 21 is located in the accommodation recess, an elastic sealing member 30 is provided between the bottom of the accommodation recess 111 and the tire pressure detection chip 21, is in a compressed state, and is provided with a communication hole 31 communicating with the detection hole 211 and the vent hole 112, so that the elastic sealing member 30 can seal the gap between the tire pressure detection chip 21 and the bottom wall of the accommodation recess 111. The detection hole

211 and the communication hole 31 of the vent hole 112 form an enclosed channel, and the tire pressure detection chip 21 contacts the air inside the tire only through the enclosed channel to detect the air pressure inside the tire and prevent the air inside the tire from contacting other parts of the tire pressure detection chip 21 and causing corrosion. By filling the flexible sealant 40 between the inner peripheral wall of the accommodation recess 111 and the outer peripheral wall of the elastic sealing member 30, and between the inner peripheral wall of the accommodation recess 111 and the outer peripheral wall of the tire pressure detection chip 21, the end of the tire pressure detection chip 21 provided with the detection hole 211 is placed in the accommodation recess 111 to be sealed and protected, so that the sealability of the tire pressure detection chip 21 is greatly improved; in addition, the elastic sealing member 30 and the flexible sealant 40 can buffer the force of the housing 10 acting on the tire pressure chip due to vibration or the like by the elasticity thereof.

Figure 5:
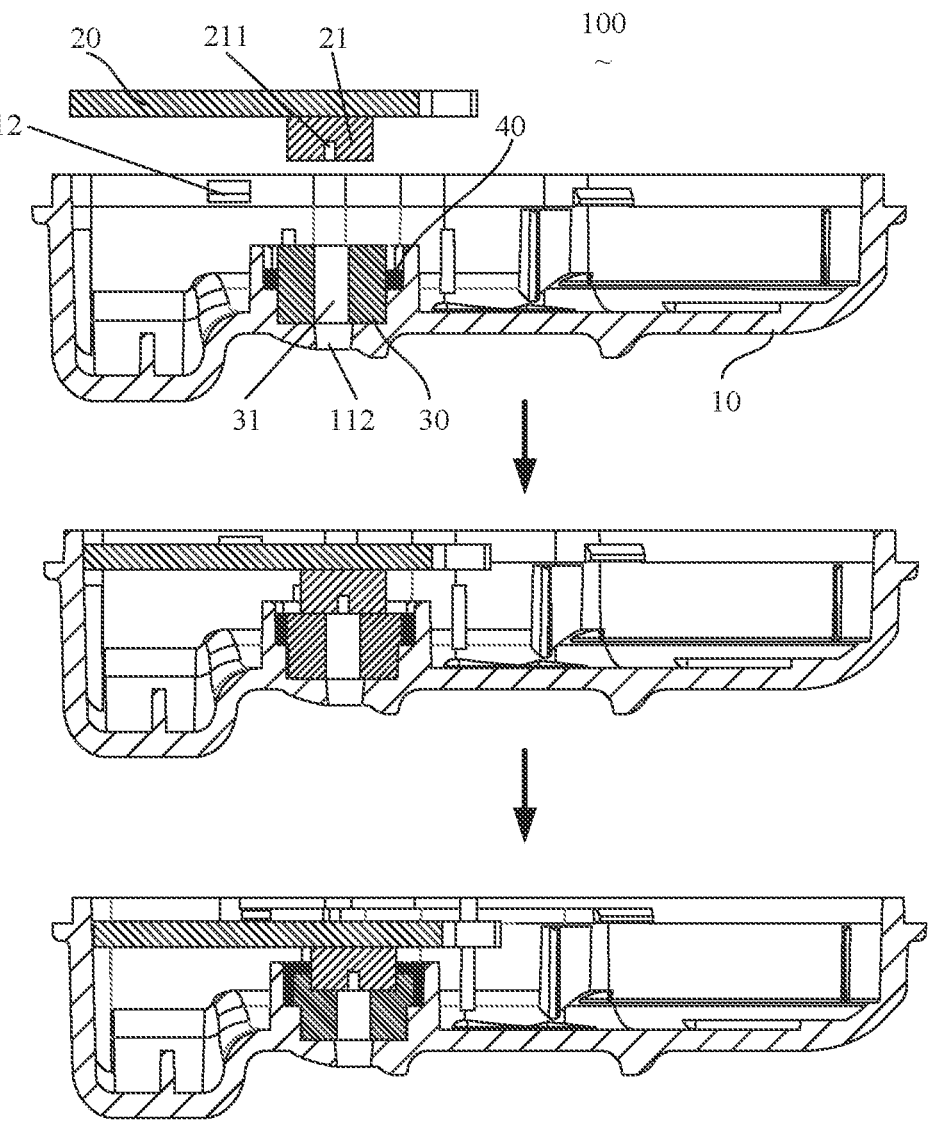
FIG. 5 is a schematic diagram showing an encapsulation process of a tire pressure detection chip in the tire pressure sensor according to an embodiment of the present application.

Compared with the conventional tire pressure sensor 100, in addition to its own sealing, the tire pressure detection chip 21 of the embodiment of the present application also seals one end of the tire pressure detection chip 21 provided with the detection hole 211 via the elastic sealing member 30 and the flexible sealant 40 (i.e., the elastic sealing member 30 and the flexible sealant 40 can further seal one end of the chip body cover provided with the metal cover and an outer peripheral surface portion of the chip body and the metal cover adjacent thereto), thereby achieving double sealing and having a better sealing effect; at the same time, both the elastic sealing member 30 and the flexible sealant 40 can reduce the impact of the external force on the tire pressure detection chip 21 through the elastic property, so that the tire pressure detection chip 21 can work in the complex and harsh environment such as wet, vibration and high-speed rotation environment inside the tire, which is beneficial to improve the service life of the tire pressure detection chip 21. Referring to FIG. 5 in conjunction with FIGS. 1 to 4, FIG. 5 shows a schematic diagram of the encapsulation process of the tire pressure sensing chip 21 in the tire pressure sensor 100 according to an embodiment of the present application.

In some embodiments, a limiting groove 113 is provided at the middle of the bottom wall of the accommodation recess 111, the accommodation recess 111, the limiting groove 113 and the vent hole 112 are successively arranged in communication from top to bottom in the fixed base 11, and in the axial direction of the vent hole 112, the cross-sectional area of the limiting groove 113 is greater than the cross-sectional area of the vent hole 112 and less than that of the accommodation recess 111. The elastic sealing member 30 is adapted to the limiting groove 113, and a part of the elastic sealing member 30 is located in the limiting groove 113, and the other part is located in the accommodation recess 111 and is in extrusion contact with the tire pressure detection chip 21. The limiting groove 113 may be provided at the center of the bottom of the accommodation recess 111, or may be provided at an area near the center of the bottom wall of the accommodation recess 111. Preferably, the central lines of the limiting groove 113 and the accommodation recess 111 are all located on a central axis of the vent hole 112, that is to say, the accommodation recess 111, the limiting groove 113 and the vent hole 112 are coaxially arranged. The accommodation recess 111, the limiting groove 113 and the vent hole 112 may each be a cylindrical hole having a circular cross section, or a prismatic hole having a polygonal cross section such as a square or a rectangle, and are not particularly limited herein.

When encapsulation is performed, one end of the elastic sealing member 30 is inserted into the limiting groove 113, and then the liquid flexible sealant 40 is filled into the accommodation recess 111 via a dedicated glue spraying device, so that the flexible sealant 40 can be filled into a filling gap between the outer peripheral wall of the elastic sealing member 30 and the inner peripheral wall of the accommodation recess 111. After the flexible sealant 40 is injected, the tire pressure detection chip 21 is placed into the accommodation recess 111 from the top to the bottom from the opening of the accommodation recess 111 to extrude contact with an upper surface of the elastic sealing member 30. In the process of compressing the elastic sealing member 30 from top to bottom, the elastic sealing member 30 will deform so that the filling gap between the outer peripheral wall of the elastic sealing member 30 and the inner peripheral wall of the accommodation recess 111 becomes smaller, so that the liquid flexible sealant 40 in the filling gap overflows into the gap between the outer peripheral wall of the elastic sealing member and the inner peripheral wall of the accommodation recess 111, and when the liquid flexible sealant 40 is coagulated, the elastic sealing member 21 will be sealed and fixed in the accommodation recess 111, and encapsulation is completed.

Before and after the encapsulation, the space between the outer peripheral wall of the elastic sealing member 30 and the inner peripheral wall of the accommodation recess 111 can be filled with a space volume $V_1$ of the flexible sealant 40, and when the tire pressure detection chip 21 is placed in the accommodation recess 111 to reach the placement depth required for sealing, the space volume $V_2$ which can be filled between the outer peripheral wall of the flexible sealant 40 and the inner peripheral wall of the accommodation recess 111 should satisfy the following relationship:

$$V_1 \text{ before compression} = V_1 \text{ after compression} + V_2$$

$V_1 \text{ }_{before\ compression}$, $V_1 \text{ }_{after\ compression}$ and $V_2$ are rational numbers greater than 0; $V_1$ before compression is before the elastic seal 30 is compressed by the tire pressure detection chip 21, the space between the outer peripheral wall of the elastic sealing member 30 and the inner peripheral wall of the accommodation recess 111 can be filled with the space volume of the flexible sealant 40; $V_1 \text{ }_{after\ compression}$ is a space volume in which the space between the outer peripheral wall of the elastic sealing member 30 and the inner peripheral wall of the accommodation recess 111 can be filled with the flexible sealant 40 after the elastic sealing member 30 is compressed when the tire pressure detection chip 21 is inserted into the accommodation recess 111 to reach the insertion depth required for sealing (for example, when the tire pressure detection chip 21 is completely inserted into the accommodation recess 111).

In this embodiment, by arranging the limiting groove 113 at the central position of the bottom wall of the accommodation recess 111, the limiting groove 113 is adapted to the elastic sealing member 30, so that when one part of the elastic sealing member 30 is inserted into the limiting groove 113, there is a filling gap between the outer peripheral wall of the other part of the elastic sealing member 30 located in the accommodation recess 111 and the inner peripheral wall of the accommodation recess 111 which can be filled with the flexible sealant 40, and by the limiting function of the limiting groove 113, the elastic sealing member 30 is not easy to be displaced when encapsulation is performed to improve the reliability of encapsulation.

It should be noted that, in other embodiments, the bottom wall of the accommodation recess 111 may be free of the limiting groove 113.

With continued reference to FIGS. 1 to 5, in some embodiments, the area of the side of the elastic sealing member 30 facing the tire pressure detection chip 21 is larger than the area of the tire pressure detection chip 21 facing the elastic sealing member 30 to ensure that the side of the tire pressure detection chip 21 opposite to the elastic sealing member 30 can contact the elastic sealing member 30, thereby improving the sealing effect, and at the same time, during encapsulation, facilitating the overflow of the liquid flexible sealant 40 from below into the gap between the outer peripheral wall of the tire pressure detection chip 21 and the inner peripheral wall of the accommodation recess 111.

In some particular embodiments, the elastic sealing member 30 may be made of a material having elasticity such as silica gel, rubber, etc. so that the elastic sealing member 30 may elastically deform to cushion the external force applied to the tire pressure detection chip 21, and reduce the external force to damage the tire pressure detection chip 21.

In some embodiments, the flexible sealant 40 has a viscosity of 1500 to 4500 cps.

In the encapsulation, it is required that the liquid flexible sealant 40 has a certain viscosity and fluidity, because under the double influence of viscosity and capillary phenomenon, the liquid flexible sealant 40 does not immediately overflow to the outer peripheral surface of the tire pressure detection chip 21, but gradually covers the tire pressure detection chip 21 in a stationary process after the assembly is completed to ensure the reliability of the encapsulation.

If the viscosity of the flexible sealant 40 is too low, the elastic sealing member 30 is compressed and deformed by the tire pressure detection chip 21 at the time of encapsulation, and the liquid flexible sealant 40 easily flows into the gap between the elastic sealing member 30 and the tire pressure detection chip 21, and easily blocks or contaminates the detection hole 211 of the tire pressure detection chip 21, resulting in the failure of the tire pressure detection chip 21. In addition, if the viscosity is too low, the coagulation time of the hydraulic flexible sealant 40 will also be prolonged, reducing the production efficiency. If the viscosity of the flexible sealant 40 is too high, it is difficult for the flexible sealant 40 to flow onto the tire pressure detection chip 21, resulting in poor sealing effect. Therefore, in this embodiment, by setting the viscosity of the flexible sealant 40 to be 1500-4500 cps, within this viscosity range, the fluidity of the liquid flexible sealant 40 can meet the above-mentioned encapsulation requirements to ensure the reliability after encapsulation, reduce the setting time of the liquid elastic sealing member 30 and improve the production efficiency.

It will be appreciated that in other embodiments, the viscosity of the flexible sealant 40 may also be greater than 4500 cp or less than 1500 cps.

In some embodiments, the inner sidewall of the accommodation recess 111 at the opening is further provided with a plurality of exhaust channels 114 spaced along an edge of the opening of the accommodation recess 111.

Since it is necessary to place the tire pressure detection chip 21 on the circuit board 20 in the accommodation recess 111 into extrusion contact with the upper surface of the elastic sealing member 30 in a short time after pouring the liquid-state flexible sealant 40 into the accommodation recess 111 during encapsulation, if the gas in the accommodation recess 111 cannot be discharged out of the accommodation recess 111, it is easy for the elastic sealing member 30 to form bubble holes after coagulation, resulting in poor sealing effect or sealing failure.

Therefore, in this embodiment, by providing a plurality of exhaust grooves 114 spaced along the edge of the opening of the accommodation recess 111 at the inner side wall of the opening of the accommodation recess 111, the gas inside the accommodation recess 111 can be discharged in time during encapsulation to avoid defects such as bubble holes which affect the sealing effect after encapsulation, and at the same time, excess liquid flexible sealant 40 can also flow into the exhaust grooves 114 to avoid overflowing outside the accommodation recess 111.

In some embodiments, the gap between the inner peripheral wall of the accommodation recess 111 and the outer peripheral wall member of the elastic sealing member 30 is 0.6-1.2 mm. The larger the gap between the inner peripheral wall of the accommodation recess 111 and the outer peripheral wall member of the elastic sealing member 30, the more amount of the flexible sealant 40 needs to be filled during encapsulation, and the longer the time required for coagulation, which affects the encapsulation efficiency and the material cost. In this gap range, it can be ensured that the sealing and impact-resistant protection effect of the tire pressure detection chip 21 can be ensured after encapsulation, while the manufacturing cost of the product can be taken into consideration.

It will be appreciated that in other embodiments the gap between the inner peripheral wall of the accommodation recess 111 and the outer peripheral wall member of the resilient seal 30 may also be greater than 1.2 mm or less than 0.6 mm.

In some particular embodiments, a buckle 12 is further provided in the housing 10, the height of the buckle 12 inside the housing 10 is higher than that of the fixed base 11 inside the housing 10, the circuit board 20 covers the top opening of the accommodation recess 111, and the buckle 12 is fixedly clamped with the circuit board 20. The circuit board 20 is fixedly connected to the housing 10 by means of a buckle 12, so that the circuit board 20 can be mounted and fixed inside the housing 10 at the top of the opening of the accommodation recess 111 when the liquid flexible sealant 40 is not coagulated during encapsulation. The number of the buckles 12 is at least two, and two buckles 12 can be respectively provided on two opposite sides of the inside of the housing 10; of course, in some embodiments, one of the buckles 12 can be provided on an inner side wall of the housing 10 adjacent to the fixed base, and the other buckles 12 are provided on a snap arm inside the housing 10, wherein the fixed base is located between the snap arm and the inner side wall of the housing 10 provided with the buckles 12.

It should be noted that there may be a gap between the circuit board 20 and the opposite end face of the top of the accommodation recess 111. However, in other embodiments, the circuit board 20 and an opposite end face of the top of the accommodation recess 111 may be in contact with each other after the buckle 12 is buckled to be connected to the circuit board 20.

In some particular embodiments, the exterior of the housing 10 is also provided with a connecting portion 13 for fixed connection with the valve of the tire. Specifically, the connecting portion 13 is provided with a connecting hole adapted to one end of the tire valve inside the tire, and one end of the tire valve inside the tire is inserted and fixed into the connecting hole.

In some embodiments, the tire pressure sensor 100 further includes a housing cap 50 fixedly attached to the housing 10 and enclosing an enclosed space in which the circuit board 20 is located. Here, the housing cap 50 and the outer housing 10 may be made of nylon plus glass fiber. The housing cap 50 may be provided on the top of the housing 10 to cover and seal the inside of the housing 10 to further improve the sealing effect of the tire pressure sensor 100 to seal and protect the structure of the circuit board 20 and improve the service life thereof.

Of course, in other embodiments, the circuit board 20 may also be sealed inside the housing 10 after the encapsulation of the tire pressure sensing chip 21 inside the housing 10 is completed and then the housing 10 is filled with a sealant.

In some embodiments, the tire pressure sensor 100 further comprises a power supply battery (not shown), wherein the power supply battery is arranged inside the housing 10, i.e., the power supply battery is located in an enclosed space enclosed by the housing cap 50 and the housing 10, and the power supply battery is electrically connected to the circuit board 20 for supplying power to power consumption components such as the circuit board 20 and the tire pressure detection chip 21 located on the circuit board 20 and electrically connected thereto.

An embodiment of the present application also provides an automobile tire including a tire body and the tire pressure sensor 100 described in each of the above embodiments, and the tire pressure sensor 100 is mounted inside the tire body. Specifically, the connection portion 13 of the tire pressure sensor 100 is fixedly connected to one end of the valve inside the tire body.

It should be noted that technical or scientific terms used in the examples of terms used in the examples herein shall have the ordinary meaning as understood by a person skilled in the art to which the examples herein pertain. In the description of the embodiments of the present application, the terms "center", "top", "bottom", "inner", "outer", "axial", "radial", "circumferential", and the like refer to orientations or positional relationships based on the orientation or positional relationships shown in the drawings, merely to facilitate the description of the embodiments of the present application and simplify the description, and do not indicate or imply that the referenced devices or elements must have a particular orientation, be constructed and operated in a particular orientation, and thus should not be construed as limiting the embodiments of the present application.

Finally, the above embodiments are only used to illustrate the technical solution of the present application, and not to limit the same; while the application has been described in detail and with reference to the foregoing embodiments, it will be understood by a person skilled in the art that: the technical solutions described in the foregoing embodiments may still be modified, or some or all of the technical features may be equivalently replaced; and these modifications or substitutions do not depart from the spirit of the corresponding technical solutions of the embodiments of the present application, and they should be covered by the claims and the description of the present application. In particular, the technical features mentioned in the various embodiments can be combined in any manner as long as there is no structural conflict. This application is not limited to the particular embodiments disclosed herein, but includes all embodiments falling within the scope of the claims.

The invention claimed is:

1. A tire pressure sensor, comprising:
   a housing, a fixed base being provided in the house, the fixed base being provided with an accommodation recess having an upward opening, and a vent hole penetrated to the exterior of the housing being provided on the bottom wall of the accommodation recess;
   a circuit board being fixed in the housing, the circuit board being provided with a tire pressure detection chip, and the tire pressure detection chip being located in the accommodation recess, and being provided with a detection hole at a position corresponding to the vent hole;
   an elastic sealing member located between the bottom wall of the accommodation recess and the tire pressure detection chip, and being used for sealing a gap between the bottom wall of the accommodation recess and the tire pressure detection chip, and the elastic sealing member being provided with a communication hole communicated with the detection hole and the vent hole;
   and a flexible sealant filled between the inner peripheral wall of the accommodation recess and the outer peripheral wall of the tire pressure detection chip, and between the inner peripheral wall of the accommodation recess and the outer periphery of the elastic sealing member;
   wherein a limiting groove is further provided at the middle of the bottom wall of the accommodation recess, the accommodation recess, the limiting groove and the vent hole are successively arranged in communication from top to bottom on the fixed base, and in an axial direction of the vent hole, the cross-sectional area of the limiting groove is greater than that of the vent hole and less than that of the accommodation recess; the elastic sealing member is adapted to the limiting groove, and part of the elastic sealing member is located in the limiting groove, and the other part is located in the accommodation recess and is in extrusion contact with the tire pressure detection chip;
   wherein an area of the face of the elastic sealing member facing the tire pressure detection chip is greater than an area of the face of the tire pressure sensor chip facing the elastic sealing member.

2. The tire pressure sensor according to claim 1, wherein a side wall of the accommodation recess at the opening is further provided with a plurality of exhaust channels spaced along an edge of the opening.

3. The tire pressure sensor according to claim 1, wherein the flexible sealant has a viscosity of 1500-4500 cps.

4. The tire pressure sensor according to claim 1, wherein the gap between the inner peripheral wall of the accommodation recess and the outer peripheral wall of the elastic sealing member is 0.8-1.0 mm.

5. The tire pressure sensor according to claim 1, wherein the elastic sealing member is made of a silicone material.

6. The tire pressure sensor according to claim 1, wherein a buckle is further provided in the housing and has a height inside the housing of greater than that of the fixed base fixed inside the housing, the circuit board is provided at the top of the opening of the accommodation recess, and the buckle is buckled to be fixed with the circuit board.

7. The tire pressure sensor according to claim 1, further comprising a housing cap connected to the housing and enclosing an enclosed space, the circuit board being located within the enclosed space.

8. An automobile tire, comprising: a tire body and the tire pressure sensor according to claim 1, wherein the tire pressure sensor is mounted inside the tire body.

* * * * *